US006649217B1

(12) United States Patent
Gust

(10) Patent No.: US 6,649,217 B1
(45) Date of Patent: Nov. 18, 2003

(54) METHOD FOR PRODUCING PARTS OF AN ANTIADHESIVE ORGANIC POWDER, PARTS PRODUCED BY SUCH A METHOD, AND DEVICE FOR PERFORMING SUCH A METHOD

(75) Inventor: Herbert Gust, Freiberg (DE)

(73) Assignee: KACO GmbH & Co., Heilbronn (DE)

( * ) Notice: Subject to any disclaimer, the term of this patent is extended or adjusted under 35 U.S.C. 154(b) by 0 days.

(21) Appl. No.: 09/418,049

(22) Filed: Oct. 13, 1999

(30) Foreign Application Priority Data

Oct. 13, 1998 (DE) .......................... 198 47 032

(51) Int. Cl.[7] .............................................. C23C 16/00
(52) U.S. Cl. .................. 427/248.1; 204/169; 427/569; 264/83; 264/483; 428/421; 428/422; 524/544; 524/546
(58) Field of Search ................. 524/546, 544; 204/169; 264/83, 483; 427/248.1, 569

(56) References Cited

U.S. PATENT DOCUMENTS

| 4,396,641 A | * | 8/1983 | Imada et al. .................. 427/41 |
| 4,548,867 A | * | 10/1985 | Ueno et al. .................. 428/409 |
| 5,427,831 A | * | 6/1995 | Stevens ...................... 428/36.2 |

* cited by examiner

*Primary Examiner*—Peter D. Mulcahy
(74) *Attorney, Agent, or Firm*—Gudrun E. Huckett

(57) ABSTRACT

A method for manufacturing parts from an antiadhesive organic powder includes the step of plasma-treating the antiadhesive organic powder and processing the antiadhesive organic powder for forming the parts. The device for performing the method has a housing with a receiving chamber that has at least one inlet for introducing a process gas. A rotary drum is rotatably mounted in the receiving chamber for supporting the antiadhesive organic powder. At least one electrode is mounted in the receiving chamber and at least one energy source is connected to the electrode for energizing the electrode. The process gas can be exposed to high frequency radiation or microwave radiation in order to produce a plasma.

25 Claims, 1 Drawing Sheet

METHOD FOR PRODUCING PARTS OF AN ANTIADHESIVE ORGANIC POWDER, PARTS PRODUCED BY SUCH A METHOD, AND DEVICE FOR PERFORMING SUCH A METHOD

BACKGROUND OF THE INVENTION

The present invention relates to a method for producing parts of an antiadhesive organic material in powder form, preferably polyfluorocarbon, and most preferred polytetrafluoroethylene. The invention also relates to parts produced according to the inventive method and also to a device for performing such a method, wherein the device comprises a housing having a receiving chamber and a support for the antiadhesive organic powder material to be treated therein. At least one energy source and at least one electrode are positioned in the receiving chamber. At least one inlet line for a process gas opens into the receiving chamber.

An antiadhesive organic material is, for example, polytetrafluoroethylene. It is a thermally and chemically highly stable thermoplastic material with antiadhesive properties. These properties prevent the polytetrafluoroethylene from becoming directly bonded to other materials. Accordingly, for polytetrafluoroethylene composites a fixed bonding between embedded fillers and the matrix of polytetrafluoroethylene is not possible.

Polytetrafluoroethylene composites containing fibers are characterized in that the fibers have no or only minimal adhesion to the polytetrafluoroethylene due to the antiadhesive properties of the polytetrafluoroethylene. Because of an inner notching effect of the fibers within the composite, the fibers are known to considerably reduce the stability of the composite material.

For elastomer-modified polytetrafluoroethylene (EMP) there is also no fixed or secure bonding possible between the embedded powder particles of polytetrafluoroethylene and the elastomer matrix. This is especially disadvantageous when the EMP is subjected to tensile load and exposed to various (aggressive) media. In these cases, the polytetrafluoroethylene particles cannot contribute to the force distribution because they have no adhesive connection to the elastomer matrix. The forces therefore can only be transmitted by the very thin matrix stays of elastomer material between the polytetrafluoroethylene particles. Especially when a high amount of polytetrafluoroethylene (PTFE) filler is embedded in the elastomer matrix, i.e., for an amount of approximately 20 to 50% by weight PTFE in the matrix, the intermediate elastomer regions are very sensitive and can be quickly destroyed when exposed to (aggressive) media or high temperature.

It is therefore an object of the present invention to embody the aforementioned method, the aforementioned part, and the aforementioned device such that the organic powders that have antiadhesive properties can be imparted in a simple and inexpensive manner with properties allowing a fixed bonding between same particles or with other materials.

SUMMARY OF THE INVENTION

This object is inventively solved for the method in that the antiadhesive organic powder is plasma-treated before further processing for manufacturing the parts occurs. The parts of the present invention are characterized in that a plasma-treated antiadhesive organic powder is used for the parts. The inventive device is characterized in that a rotary drum is used as a support for the antiadhesive organic powders.

The plasma treatment of the antiadhesive organic powder materials results in a plasma etching and/or in chemical changes in the micro-range at the surface of the powder particles. The plasma-activated surface of the powder particles ensures that these particles can reliably fixedly bond to one another or with other components without requiring wet-chemical etching processes. For a polytetrafluoroethylene fiber composite, the fibers are embedded fixedly in the polytetrafluoroethylene matrix so that the stability of such a fiber-filled polytetrafluoroethylene composite is considerably increased. At the same time, an increase of the composite material stiffness occurs. The undesirable cold flowing properties and creeping of polytetrafluoroethylene can be substantially decreased in this manner. For elastomer-modified polytetrafluoroethylene (EMP) a fixed adhesion between the polytetrafluoroethylene particles and the elastomer matrix occurs. Because of this fixed adhesion the total boundary surface can receive and distribute forces. The polytetrafluoroethylene particles thus contribute to the force flow within the composite material so that the entire composite material exhibits only minimal sensitivity. The term powder in the context of the present invention also includes micro-powders which are treated in the same manner as disclosed above by a plasma treatment. Carrying out the plasma activation of the powder or micro-powder in the rotary drum of the inventive device ensures an excellent mixing of the powder during the plasma treatment so that an optimal activation of the powder particles is realized.

BRIEF DESCRIPTION OF THE DRAWINGS

The object and advantages of the present invention will appear more clearly from the following specification in conjunction with the only drawing, showing in a schematic representation the inventive device for plasma treatment of antiadhesive organic powder materials.

DESCRIPTION OF PREFERRED EMBODIMENTS

Figure 1:
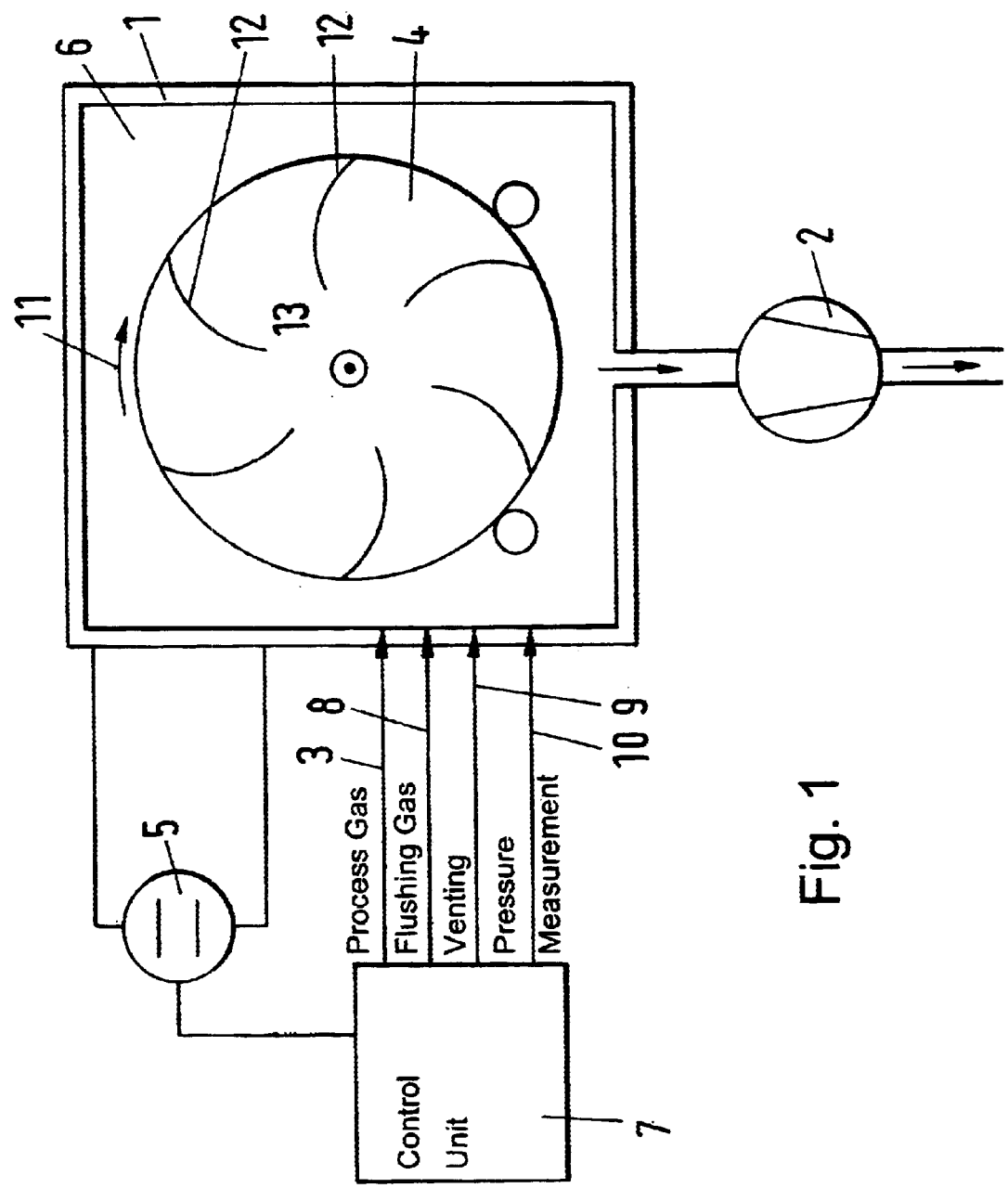

The present invention will now be described in detail with the aid of several specific embodiments utilizing the only figure.

Antiadhesive organic materials such as polyfluorocarbon are known which, because of their antiadhesive properties, cannot be directly bonded to other materials. One of the important representative materials of such organic powders is polytetrafluoroethylene which is used in various fields of application.

In order to reduce the antiadhesive properties considerably or to eliminate them entirely, these powder materials are subjected to a plasma treatment before mixing and/or further processing. This plasma treatment results in a plasma etching and/or in a chemical change within the micro-range at the surface of the individual powder particles. The powder particles which have been plasma-activated at their surface can then be reliably bonded to one another without requiring additional components or a wet-chemical etching process. The plasma-treated powder can be further processed directly after the plasma treatment or after intermediate storage.

It is possible to sinter the plasma-treated powders without adding further components in order to produce different parts. Due to the plasma treatment the powder particles are fixedly connected or bonded to one another by the sintering process so that the sintered parts produced from the powder have high stability.

The drawing shows as an exemplary device for treating the powder by plasma treatment. The device has a housing 1 with a receiving chamber in which the plasma treatment of the powder is carried out. In the receiving chamber 6 of the housing 1 vacuum is generated by the vacuum pump 2. At a pressure of approximately 0.1 to 1 mbar a process gas is introduced into the receiving chamber 6 of the housing 1 via line 3. In the receiving chamber 6 a support 4 for the powder is provided which is preferably embodied as a rotary drum that is rotated about a horizontal axis. A high frequency generator 5 which operates in the kilo, mega, or giga hertz range ionizes the process gas present within the receiving chamber 6 of the housing 1 so that a plasma is generated. The rotary drum 4 is provided at least at one end, preferably at both ends, with openings so that the process gas can reach the powder contained within the rotary drum 4.

The high frequency generator 5 is connected to a control unit 7 with which the supply of process gas via the line 3, the supply of the flushing gas via the line 8, venting via line 9, and pressure measurement via line 10 are controlled.

For the plasma treatment of the powder a vacuum is generated via the vacuum pump 2. As soon as the desired vacuum is reached, the process gas is introduced via line 3 in a controlled fashion by the control unit 7 into the receiving chamber 6 of the housing 1. For producing the plasma, energy in the form of high frequency is provided so that the process gas is ionized. The high frequency generator 5 is controlled by the control unit 7 so that the high frequency energy is introduced into the process gas via electrodes or via a non-represented antenna. Via line 10 the pressure in the receiving chamber 6 of the housing 1 can be simply and reliably detected or measured by the control unit 7. Via the line 8 a flushing gas can be introduced into the receiving chamber 6 of the housing 1. The receiving chamber 6 of the housing 1 can be vented via line 9 after completion of the plasma treatment of the powder.

The process gas can be any gas that is conventionally used in the plasma technology such as, for example, air, $O_2$, $AR_1$ $N_2$, $H_2$, $NH_3$, $CH_4$, $CF_4$ or mixtures of these gases. Especially good results can be obtained for polyfluorocarbon with hydrogen-containing process gases.

In order to ensure an optimal plasma treatment of the powder, the rotary drum 4 during plasma treatment is rotatably driven about a horizontal axis in the direction of arrow 11. In order to ensure good mixing and thus an homogenous plasma activation of the powder, inwardly projecting vanes 12 are fastened to the inner wall of the rotary drum 4 which relative to the rotary direction 11 are curved rearwardly. Advantageously, the vanes 12 are uniformly distributed over the inner circumference of the rotary drum 4 and the vanes 12 end preferably at a spacing to the rotary axis of the rotary drum 4. These vanes 12 are comprised of perforated sheet metal or a grate material so that the plasma can pass through the openings in the vanes 12 and reach the powder. The openings in the vanes 12 provide a desirable plasma concentration at the powder so that the powder can be treated optimally by the plasma.

The electrode 13 required for producing the plasma can be positioned within the rotary axis of the rotary drum 4 and can be in the form of a rod or a tube. It is also possible to embody the vanes 12 as an electrode so that an especially intensive plasma treatment of the powder is achieved since the powder rests directly on the vanes 12.

Due to the curved embodiment of the vanes 12, turbulent flow with intensive mixing is created within the powder so that all powder particles are uniformly exposed to the plasma and are accordingly uniformly treated. It is thus ensured that during the subsequent sintering process the plasma-treated powder particles will bond securely to one another.

The shown and disclosed device for treating antiadhesive organic powders is only an exemplary embodiment. Other embodiments are possible in which it is ensured that the powder to be treated is mixed thoroughly and that clump formation of the powder is prevented so that a homogenous and satisfactory activation of the powder particles results.

The plasma-treated powder which is preferably a polyfluorocarbon, especially polytetrafluoroethylene, can be mixed with other components. While in the afore disclosed embodiment the plasma-treated powder is processed (sintered) without any additional components, it is possible to add and admix additional components to the plasma-treated powder. It is also possible to mix the plasma-treated powder as a filler into any other main component of a mixture.

When the powder is a polyfluorocarbon, especially polytetrafluoroethylene, this powder, after plasma treatment, can be mixed with at least one further component to a compound and can then be processed. For example, a plasma-treated polytetrafluoroethylene powder can be mixed with fibers, especially fiberglass. After processing, the polytetrafluoroethylene forms a matrix in which the fibers are fixedly embedded. Because of the plasma treatment of the polytetrafluoroethylene powder a fixed bonding between the resulting matrix and the fibers is achieved. Accordingly, these composites have a very high stability. At the same time, an increase of the composite material stiffness is produced. A part comprised of such a composite has considerably reduced cold flow properties and has also a reduced creeping tendency.

For improving adhesion, it is possible to add bonding agents to the fillers.

The described fiberglass is treated with so-called sizing agents which are, for example, silanes or perfluorinated ether. These sizing agents are selected according to the properties of the polytetrafluoroethylene. It is also possible to employ aramid fibers. After mixing of the plasma-treated powder and these fibers, the mixture is sintered. As with the pure antiadhesive organic powder without further additives, it is possible to produce by sintering semi-finished products or finished products of the antiadhesive organic powder material with admixed fibers.

As a filler for the disclosed composites, it is possible to employ graphite or organic fillers. The fillers can be present in a concentration of approximately 5 to approximately 50% by weight in the composite.

Elastomer-modified polytetrafluoroethylene (EMP) is also known wherein the polytetrafluoroethylene powder particles are embedded in an elastomer matrix. Due to the plasma treatment of the polytetrafluoroethylene powder, a fixed adhesion between the powder particles and the elastomer matrix occurs after the sintering step. Accordingly, the entire boundary between the powder particles and the elastomer matrix can be used for transmitting or distributing forces. Thus, the polytetrafluoroethylene particles also contribute to the force flow. The inventive EMP material is also less susceptible to tensile load and is less rapidly destroyed by exposure to different (aggressive) media and/or high temperatures in comparison to conventional elastomer-modified polytetrafluoroethylene in which the polytetrafluoroethylene has not been subjected to plasma treatment.

In the above disclosed composites the plasma-treated powder of antiadhesive organic materials is first plasma-treated and then mixed with further components. It is also possible to mix the desired fillers into the antiadhesive organic materials before the step of plasma treatment and to subject the resulting mixture to the plasma treatment process. In these cases a fixed and intimate connection between the antiadhesive organic materials as well as the fillers is also achieved.

As a preferred antiadhesive organic material polytetrafluoroethylene is suggested. The disclosed inventive manufacture provides highly stable and coldflow-reduced as well as creeping-reduced polytetrafluoroethylene composites or parts. In regard to the preparation of elastomer-modified polytetrafluoroethylene, the particles have considerably improved properties with respect to tensile load, media exposure as well as temperature exposure, and resistance of the material in comparison to conventional elastomer-modified polytetrafluoroethylene.

The polyfluorocarbon materials can be homopolymers, especially polytetrafluoroethylene. As a homopolymer it is also possible to use poly(vinylidene fluoride), poly(vinyl fluoride), etc. As a polyfluorocarbon material it is also possible to use copolymers such as, for example, poly (fluoroethylene co propylene), poly(vinylidene fluoride co hexafluoropropylene), poly(ethylene co tetrafluoroethylene), and perfluoroalkoxyalkane-based co-polymer etc. These polyfluorocarbons exhibit very high chemical resistance even at increased temperatures, are physiologically indifferent, non-flammable, respectively, flame-resistant, and have excellent gliding and antiadhesive properties.

With a corresponding plasma activation it is also possible to directly apply a lacquer to the surface of the produced polytetrafluoroethylene composite parts or sintered polytetrafluoroethylene parts without any additional treatment of the polytetrafluoroethylene part being required. Printing on the surfaces of the parts as well as gluing of the parts to other materials, for example, to plastic materials is possible. The parts can also be fixedly connected, for example, by injection molding processes, to other plastic materials, or by vulcanization to elastomers.

The required energy for the ionization of the process gas can be introduced alternatively or additionally by microwaves into the receiving chamber 6 of the housing 1. The plasma producing device thus has a microwave mains supply circuit which is positioned external to the housing 1 and connected to the magnetron. An antenna is provided which projects into a hollow conductor. The magnetron is an electron tube oscillator which vibrates at a fixed frequency. The antenna of the magnetron is not positioned in the vacuum of the receiving chamber 6. The receiving chamber 6 is separated from the magnetron with antenna by a glass window via which the microwave radiation can be introduced into the receiving chamber 6 of the housing 1. The microwave adaptor is advantageously also connected to the control unit 7.

The specification incorporates by reference the disclosure of German priority document 198 47 032.0 of Oct. 13, 1998

The present invention is, of course, in no way restricted to the specific disclosure of the specification and drawing, but also encompasses any modifications within the scope of the appended claims.

What is claimed is:

1. A method for manufacturing parts from an antiadhesive organic powder comprising individual powder particles, said method comprising the steps of:

plasma-treating the antiadhesive organic powder in a turbulent flow with intensive mixing of the antiadhesive organic powder during plasma-treating as needed to ensure homogenous activation, wherein said plasma-treating produces plasma etching within a micro-range of the surface area of said Individual powder particles imparting properties allowing a fixed bonding of the individual powder particles for forming the parts; and processing the antiadhesive organic powder to form the parts.

2. A method according to claim 1, wherein in said step of plasma-treating the antiadhesive organic powder is mixed.

3. A method according to claim 1, wherein in said step of processing the antiadhesive organic powder is sintered.

4. A method according to claim 1, wherein in said step of processing the antiadhesive organic powder is mixed with at least one additional component.

5. A method according to claim 4, wherein said at least one additional component is a filler.

6. A method according to claim 5, wherein said filler consists of fibers or graphite.

7. A method according to claim 4, wherein said at least one additional component is a plastic material selected from the group consisting of an elastomer, a thermoplastic material, and a thermosetting resin.

8. A method according to claim 1, further including the step of admixing at least one additional component into the antiadhesive organic powder before said step of plasma-treating.

9. A method according to claim 8, wherein said at least one additional component is a filler.

10. A method according to claim 9, wherein said filler consists of fibers or graphite.

11. A method according to claim 8, wherein said at least one additional component is a plastic material selected from the group consisting of an elastomer, a thermoplastic material, and a thermosetting resin.

12. A part comprising an antiadhesive organic powder, said part manufactured by plasma-treating said antiadhesive organic powder in a turbulent flow with intensive mixing of the antiadhesive organic powder during plasma-treating as needed to ensure homogenous activation, wherein said plasma-treating produces plasma etching within a microrange of the surface area of said individual powder particles imparting properties allowing a fixed bonding of the individual powder particles for forming the parts and processing the antiadhesive organic powder to form said part.

13. A part according to claim 12, comprised only of said antiadhesive organic powder.

14. A part according to claim 12, comprising at least one additional component.

15. A part according to claim 12, wherein said at least one additional component is present in said part in an amount of between 5 and 50% by weight.

16. A part according to claim 14, wherein said at least one additional component is a filler.

17. A part according to claim 16, wherein said filler consists of fibers or graphite.

18. A part according to claim 14, wherein said at least one additional component is a plastic material selected from the group consisting of an elastomer, a thermoplastic material, and a thermosetting resin.

19. A part according to claim 18, wherein said plastic material is present in an amount of more than 50% by weight.

20. A part according to claim 12, wherein said antiadhesive organic powder consists of a polyfluorocarbon.

21. A part according to claim 20, wherein said antiadhesive organic powder consists of a homopolymer of a fluorocarbon.

22. A part according to claim 20, wherein said polyfluorocarbon is polytetrafluoroethylene, poly(vinylidene fluoride), or poly(vinyl fluoride).

23. A part according to claim 20, wherein said polyfluorocarbon is a copolymer of at least one fluorocarbon monomer.

24. A part according to claim 23, wherein said copolymer is poly(fluoroethylene co propylene), poly(vinylidene fluoride co hexafluoropropylene), or poly(ethylene co tetrafluoroethylene).

25. A part according to claim 23, wherein said fluorocarbon monomer is perfluoroalkoxyalkane.

* * * * *